(12) United States Patent
Kishimoto et al.

(10) Patent No.: US 6,600,532 B2
(45) Date of Patent: *Jul. 29, 2003

(54) COLOR FILTER AND LIQUID CRYSTAL DISPLAY SUBJECT TO IMPURITY EXTRACTION TREATMENT FOR VOLTAGE HOLDING RATIO OF 80% OR MORE

(75) Inventors: Takehide Kishimoto, Tokyo-to (JP); Hideaki Yamagata, Tokyo-to (JP); Takashi Nishimoto, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 55 days.

This patent is subject to a terminal disclaimer.

(21) Appl. No.: 09/769,930

(22) Filed: Jan. 24, 2001

(65) Prior Publication Data

US 2001/0017677 A1 Aug. 30, 2001

(30) Foreign Application Priority Data

Jan. 25, 2000 (JP) ......... 2000-015292

(51) Int. Cl.⁷ ............. G02F 1/1335
(52) U.S. Cl. ......... 349/106; 349/110; 349/155
(58) Field of Search ............. 349/107, 108, 349/109

(56) References Cited

U.S. PATENT DOCUMENTS 5,453,217 A * 9/1995 Keneko et al. ......... 252/299.1
6,413,686 B2 * 7/2002 Kishimoto et al. ......... 430/7
6,414,733 B1 * 7/2002 Ishikawa et al. ......... 349/110

FOREIGN PATENT DOCUMENTS

| JP | 08006030 | 1/1996 |
|---|---|---|
| JP | 09090412 | 4/1997 |
| JP | 2000009919 | 1/2000 |
| JP | 2000029007 | 1/2000 |
| JP | 2000292920 | 10/2000 |

* cited by examiner

Primary Examiner—Toan Ton
Assistant Examiner—Timothy Rude
(74) Attorney, Agent, or Firm—Timothy J. Keefer; Wildman, Harrold, Allen & Dixon

(57) ABSTRACT

An object of the present invention is to provide a color filter for reliably preventing the liquid crystal layer from being contaminated with ionic materials, as well as a liquid crystal display excellent in display qualities. To achieve the object described above, the present invention provides a color filter comprises a substrate, a resin colored layer consisting of a plurality of colors formed in a predetermined pattern on the substrate, and a common transparent electrode layer, said resin colored layer bringing about a voltage holding ratio of 80% or more and a residual DC (ΔE) of 0.5 V or less in a liquid crystal subjected to treatment for extraction of impurities.

14 Claims, 6 Drawing Sheets

US 6,600,532 B2

COLOR FILTER AND LIQUID CRYSTAL DISPLAY SUBJECT TO IMPURITY EXTRACTION TREATMENT FOR VOLTAGE HOLDING RATIO OF 80% OR MORE

BACKGROUND OF THE INVENTION

The present invention relates to a color filter and a liquid crystal display and in particular to a liquid crystal display excellent in display qualities and a color filter using the same.

In recent years, a color liquid crystal display attracts attention as a flat display. As one example of the color liquid crystal display, there is a transmission-type liquid crystal display in which a color filer having a black matrix, colored layers consisting of a plurality of colors (usually the 3 primary colors of red (R), green (G) and blue (B)), a common transparent electrode layer and an orientation layer is opposed via a predetermined gap to an opposite electrode substrate having a thin film transistor (TFT element), a picture element electrode and an orientation layer, wherein a liquid crystal layer is formed by injecting a liquid crystal material into said gap. Further, there is also a reflection-type liquid crystal display provided with a reflective layer between the color filter substrate and the colored layers described above.

Such color liquid crystal displays are liable to display insufficiencies upon a change in orientation of a liquid crystal caused by insufficient orientation of the liquid crystal, by a change in voltage applied to the liquid crystal or by varying voltage on the display. These display insufficiencies include the following sticking and white stain.

The sticking is a phenomenon in which uneven display occurs and continues for a long time in the case where a certain voltage is applied to the same picture element for a predetermined time and then reduced or stopped, and this occurs due to a difference in the light transmittance of the picture element from the transmittance of surrounding picture elements to which the voltage was not applied. In the sticking phenomenon in a normally white panel, picture elements to which a voltage was applied for a predetermined time seem darker than in surrounding picture elements. The reason for such sticking phenomenon is possibly that ionic materials adhere to the electrode during application of voltage, and after the voltage is relieved, the ionic materials are still adsorbed onto the electrode, and the voltage attributable to these ionic materials continues to act on the liquid crystal.

White stain is a phenomenon in which uneven display is observed when a black picture is indicated by applying a voltage, and this occurs because the transmittance of a part of the display does not become zero. The reason for this phenomenon may be attributable to the fact that whereas the voltage applied across the electrodes should be kept constant, the voltage across the electrodes is lowered when ionic materials are present in the liquid crystal and these are transferred between the electrodes, that is, an electric current flows between the electrodes.

It is considered that ionic materials causing the phenomena of display insufficiencies described above are easily transferred to the liquid crystal layer without being retained in the electrode. There are a large number of possible sources generating such ionic materials, and for preventing these display insufficiencies, impurities contained in chemical liquids used in the process, the air, purified water etc. and dust from devices, human body etc. are controlled during the process, and the process conditions are optimized. Further, impurities such as residues are removed by washing of the surface of the color filter or the opposite electrode substrate, by UV irradiation, or by polishing the surface thereof in the process.

The phenomena of display insufficiencies hardly occur due to these measures, but can still occur frequently under severe display conditions such as display for a long time or at high temperatures under high humidity.

SUMMARY OF THE INVENTION

The present invention was made in view of the circumstance described above, and an object of the present invention is to provide a color filter for reliably preventing the liquid crystal layer from being contaminated with ionic materials, as well as a liquid crystal display excellent in display qualities.

The resin member brought into contact with the liquid crystal layer in the liquid crystal display is considered to be one source generating ionic materials, and the present invention was made by paying attention to the voltage holding ratio and the residual DC ($\Delta E$) in the liquid crystal subjected to the treatment for extraction of impurities from the resin member, as characteristics correlative to display insufficiencies caused by ionic materials transferred from the resin member to the liquid crystal layer.

To achieve the object described above, a color filter of a first aspect of the invention is constituted such that it comprises a substrate, a resin colored layer consisting of a plurality of colors formed in a predetermined pattern on the substrate, and a common transparent electrode layer, said resin colored layer bringing about a voltage holding ratio of 80% or more and a residual DC ($\Delta E$) of 0.5 V or less in a liquid crystal subjected to treatment for extraction of impurities.

A color filter of a second aspect of the invention is constituted such that it comprises a substrate, a colored layer consisting of a plurality of colors formed in a predetermined pattern on the substrate, a transparent resin protective layer formed to cover at least the colored layer, and a common transparent electrode layer, said resin protective layer bringing about a voltage holding ratio of 80% or more and a residual DC ($\Delta E$) of 0.5 V or less in a liquid crystal subjected to treatment for extraction of impurities.

A color filter of a third aspect of the invention is constituted such that the color filter of the second aspect further comprises transparent resin pillar-shaped convexes formed in a plurality of predetermined regions on the substrate and protruded from the resin protective layer, said resin pillar-shaped convex bringing about a voltage holding ratio of 80 or more and a residual DC ($\Delta E$) of 0.5 V or less in a liquid crystal subjected to treatment for extraction of impurities.

A liquid crystal display of the first aspect of the invention is constituted such that it comprises a color filter and an opposite electrode substrate opposite to each other to provide a gap via a sealing member and a liquid crystal layer sealed in the gap, said color filter being any of the color filters described above.

A liquid crystal display of the second aspect of the invention is constituted such that it comprises a color filter and an opposite electrode substrate opposite to each other to provide a gap via a sealing member and a liquid crystal layer sealed in the gap, wherein the color filter is any of the color filters described above, the opposite electrode substrate comprises a semiconductor driving element provided with a resin shading layer, and the resin shading layer brings about a voltage holding ratio of 80% or more and a residual DC (ΔE) of 0.5 V or less in a liquid crystal subjected to treatment for extraction of impurities.

A liquid crystal display of the third aspect of the invention is constituted such that it comprises a color filter and an opposite electrode substrate opposite to each other to provide a gap via a sealing member and a liquid crystal layer sealed in the gap, wherein the color filter is the color filter of the first or second aspect of the invention described above, the opposite electrode substrate comprises a semiconductor driving element provided with resin pillar-shaped convexes, and the resin pillar-shaped convexes bring about a voltage holding ratio of 80% or more and a residual DC (ΔE) of 0.5 V or less in a liquid crystal subjected to treatment for extraction of impurities.

A liquid crystal display of the fourth aspect of the invention is constituted such it comprises a common electrode substrate and an opposite electrode substrate opposite to each other to provide a gap via a sealing member and a liquid crystal layer sealed in the gap, wherein the common electrode substrate comprises a common transparent electrode layer on the substrate, the opposite electrode substrate comprises semiconductor driving elements and a resin colored layer consisting of a plurality of colors formed in a predetermined pattern corresponding to each of the semiconductor driving elements, and the resin colored layer brings about a voltage holding ratio of 80% or more and a residual DC (ΔE) of 0.5 V or less in a liquid crystal subjected to treatment for extraction of impurities.

A liquid crystal display in the fifth aspect of the invention is constituted such that it comprises a color filter and an opposite electrode substrate opposite to each other to provide a gap via a sealing member and a liquid crystal layer sealed in the gap, wherein the color filter comprises a substrate and a reflective layer, a resin colored layer consisting of a plurality of colors and a common transparent electrode layer laminated in this order over the substrate, and the resin colored layer brings about a voltage holding ratio of 80% or more and a residual DC (ΔE) of 0.5 V or less in a liquid crystal subjected to treatment for extraction of impurities.

A liquid crystal display in the sixth aspect of the invention is constituted such that it comprises a common electrode substrate and an opposite electrode substrate opposite to each other to provide a gap via a sealing member and a liquid crystal layer sealed in the gap, wherein the common electrode substrate comprises a common transparent electrode layer on the substrate, the opposite electrode substrate comprises a substrate, a driving element layer, a reflective electrode layer, and a resin colored layer consisting of a plurality of colors laminated in this order over the substrate, and the resin colored layer brings about a voltage holding ratio of 80% or more and a residual DC (ΔE) of 0.5 V or less in a liquid crystal subjected to treatment for extraction of impurities.

As described in detail above, the rein members constituting the color filter of the present invention, which are brought directly into contact with the liquid crystal layer or positioned nearest to the liquid crystal layer via a film, are those making a voltage holding ratio and a residual DC (ΔE) in a specific range in the liquid crystal subjected to the treatment for extraction of impurities from the resin members, or the resin members which in the liquid crystal display, are brought directly into contact with the liquid crystal layer or positioned nearest to the liquid crystal layer via a film, are those making a voltage holding ratio and a residual DC (ΔE) in a specific range in the liquid crystal subjected to the treatment for extraction of impurities from the resin members, so that display insufficiencies such as sticking and white stain can be prevented even under severe display conditions such as display for a long time at high temperature and under high humidity, and the liquid crystal display excellent in display qualities is thus realized.

DESCRIPTION OF THE PREFERRED EMBODIMENTS

Hereinafter, the best mode for carrying out the present invention is described by reference to the drawings.

Color Filter

[Color Filter of First Aspect of the Invention]

Figure 1:
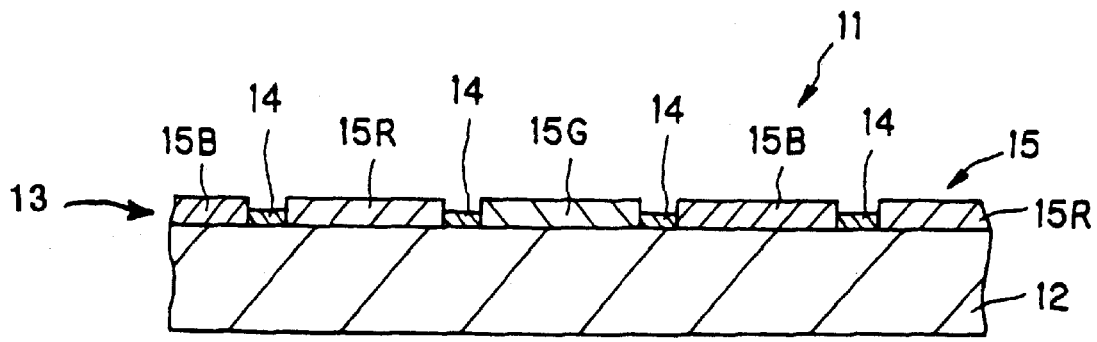
FIG. 1 is a schematic sectional view showing one embodiment of a color filter of the present invention.

FIG. 1 is a schematic sectional view showing one embodiment of a color filter of a first aspect of the invention. In FIG. 1, a color filter 11 of the present invention is provided with a substrate 12, a resin colored layer 13 consisting of a plurality of colors formed in a predetermined pattern on the substrate 12, and the resin colored layer 13 is composed of a black matrix 14 and a colored film 15 provided in regions where the black matrix 14 is not formed.

For use in a liquid crystal display, the color filter 11 is provided on the resin colored layer 13 with a common transparent electrode layer or an orientation layer where among the resin members, the resin colored layer 13 is positioned nearest to a liquid crystal. In the present invention, the resin member in contact with the liquid crystal layer in the liquid crystal display is considered to be one source generating impurities such as ionic materials, and as characteristics correlative to display insufficiency due to impurities transferred from the resin member to the liquid crystal layer, attention is paid to the voltage holding ratio and the residual DC (ΔE) in the liquid crystal subjected to treatment for extraction of impurities.

That is, voltage applied across electrodes positioned at both sides of the liquid crystal layer should be maintained to prevent white stain as one of display insufficiencies, so that in the present invention, the resin colored layer 13 is defined to make a voltage holding ratio of 80% or more, preferably 90% or more, and more preferably 95% or more in the liquid crystal subjected to the treatment for extraction of impurities. To prevent sticking as one of display insufficiencies, the residual DC (ΔE) should be minimized, and when the voltage applied to the liquid crystal layer is relieved, unnecessary voltage should be prevented from being applied to the liquid crystal layer. In the present invention, the resin colored layer 13 is defined to made a residual DC (ΔE) of 0.5 V or less, preferably 0.2 V or less and more preferably 0.1 V or less in the liquid crystal subjected to the treatment for extraction of impurities. Display insufficiencies such as sticking and white stain can thereby be prevented even under severe display conditions such as display for a long time at high temperature and under high humidity, and a liquid crystal display excellent in display qualities is thus realized.

Hereinafter, the treatment for extraction of impurities, the conditions for measurement of the retention of voltage, and the conditions for measurement of residual DC (ΔE) are described.

(Treatment for Extraction of Impurities)

A resin member with a surface area of 4 cm$^2$ is dipped in a liquid crystal with a volume of 0.2 ml and subjected to extraction by keeping it therein at 105° C. for 5 hours. The liquid crystal used shall be a liquid crystal which before treatment for extraction of impurities, has a voltage holding ratio of 95% or more and a residual DC (ΔE) of 0.05 V or less as determined under the following conditions for voltage holding ratio and residual DC (ΔE) respectively.

(Conditions for Measurement of Voltage Holding Ratio)

A measurement cell having a layer structure consisting of substrate/electrode/orientation layer/liquid crystal/orientation layer/electrode/substrate was prepared, and the liquid crystal subjected to treatment for extraction of impurities was injected into the cell and measured under the following conditions.

| | |
|---|---|
| Distance between the electrodes: | 5 to 15 μm |
| Pulse amplitude of the applied voltage: | 5 V |
| Pulse frequency of the applied voltage: | 60 Hz |
| Pulse width of the applied voltage: | 16.67 msec |

(Conditions for Measurement of Residual DC (ΔE))

Figure 2:
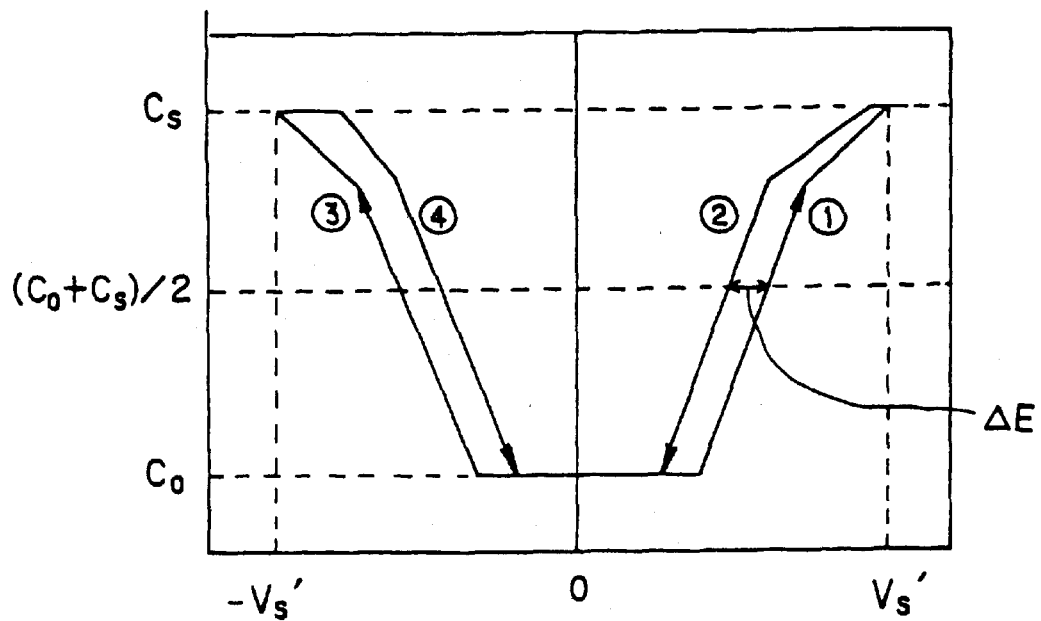
FIG. 2 shows a voltage-electrostatic capacity hysteresis loop explaining a residual DC (ΔE).

The residual DC (ΔE) is a voltage shift (shown by the arrow in FIG. 2) in the electrostatic capacity defined by formula (CO+Cs)/2 where Cs is the maximum electrostatic capacity and CO is the minimum electrostatic capacity in the voltage-electrostatic capacity hysteresis loop exemplified in FIG. 2. A measurement cell having a layer structure consisting of substrate/electrode/orientation layer/liquid crystal/orientation layer/electrode/substrate was prepared, and the liquid crystal subjected to treatment for extraction of impurities was injected into it and measured under the following conditions.

| | |
|---|---|
| Distance between the electrodes: | 5 to 15 μm |
| Liquid crystal used: | A liquid crystal with an electrostatic capacity saturation voltage (Vs' in FIG. 2) of 10 V or less |
| Voltage range measured in the voltage-electrostatic capacity hysteresis loop: | −10 V to +10 V |

For use in a liquid crystal display, the color filter 11 is provided on the resin colored layer 13 with a common transparent electrode layer or an orientation layer as described above, and the thickness of the common transparent electrode layer or the orientation layer is usually as thin as 0.01 to 1 μm so that their action of shielding the liquid crystal from impurities can hardly be expected, and thus the resin colored layer 13 should have the characteristics described above.

As the substrate 12 constituting the color filter 11 described above, inflexible transparent rigid materials such as quartz glass, Pyrex glass, synthetic quartz plate etc., or transparent flexible materials such as transparent resin film, optical resin plate etc. can be used. Among these, 7059 glass produced by Corning Co., Ltd. is a material with a low thermal coefficient of expansion, and excellent in dimensional stability and workability at high-temperature heat treatment and further it is an alkali-free glass, so it is suitable in a color filter for a color liquid crystal display in an active matrix system.

The black matrix 14 constituting the resin colored layer 13 in the color filter 11 is provided between display picture elements consisting of the colored film 15 and outside of the region where the colored film 15 is formed. The black matrix 14 may be formed by forming a resin layer containing light-shading particles such as carbon fine particles and then patterning this resin layer or by forming a photosensitive resin layer containing light-shading particles such as carbon fine particles, metal oxides etc., and then patterning this photosensitive resin layer.

In the present invention, the color filter 11 described above may not be provided with the black matrix 14. In this case, the substrate 12 may be exposed in the region where the colored film 15 is not formed, or the colored film 15 may be formed to cover the substrate 12.

In the colored film 15 constituting the resin colored layer 13 in the color filter 11, a red pattern 15R, a green pattern 15G and a blue pattern 15B are arranged in a desired pattern and shape, and can be formed not only by pigment dispersion using a photosensitive resin containing a desired coloring material, but also by known methods such as printing, transfer etc. Further, the resin colored film 15 is formed such that its thickness is increased e.g. in the order of from the red pattern 15R, the green pattern 15G and the blue pattern 15B, whereby the resin colored film 15 can set the optimum thickness of the liquid crystal layer for each color.

For conferring the above-described characteristics (a voltage holding ratio of 80% or more and a residual DC (ΔE) of 0.5 V or less in the liquid crystal subjected to the treatment for extraction of impurities) on the resin colored layer 13 consisting of the black matrix 14 and the colored film 15, resin materials such as acryl copolymers etc. can be used.

Figure 3:
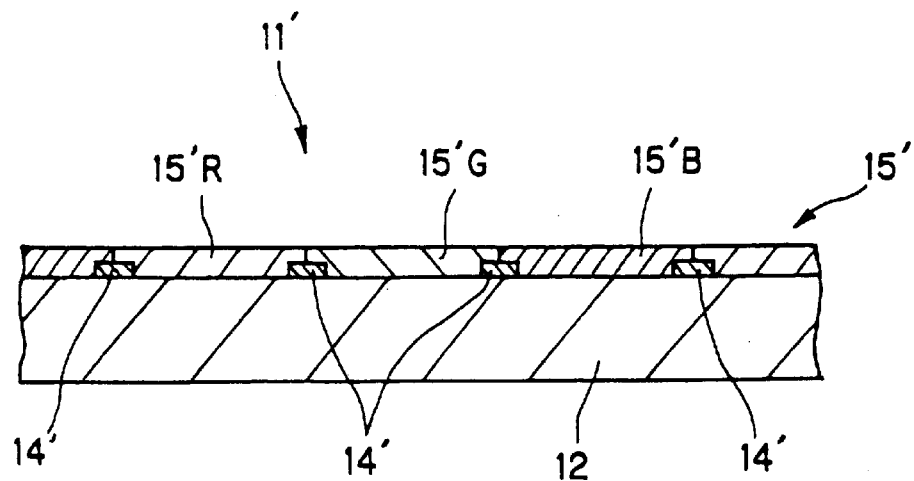
FIG. 3 is a schematic sectional view of another embodiment of the color filter of the present invention.

FIG. 3 is a schematic sectional view showing another embodiment of the color filter of the first aspect of the invention. In FIG. 3, a color filter 11' of the present invention is provided with a substrate 12, a black matrix 14' formed on the substrate 12, and a resin colored layer 15' consisting of a plurality of colors formed in a predetermined pattern to cover the black matrix 14'.

The substrate 12 constituting the color filter 11' described above can be the same as the substrate 12 constituting the color filter 11 described above.

The black matrix 14' constituting the color filter 11' is covered with the resin colored layer 15', and may be formed by forming a metal film such as chromium with a thickness of about 1000 to 2000 Å by sputtering, vacuum deposition etc. and then patterning this film, or by forming a resin layer such as polyimide resin, acryl resin, epoxy resin etc. containing light-shading particles such as carbon fine particles and then patterning this resin layer, or by forming a photosensitive resin layer containing light-shading particles such as carbon fine particles, metal oxide etc., and then patterning this photosensitive resin layer.

For use in a liquid crystal display, the resin colored layer 15' constituting the color filter 11' is provided thereon with a common transparent electrode layer or an orientation layer, where among the resin members, the resin colored layer 15' is positioned nearest to a liquid crystal. It therefore follows that similar to the colored film 15 in the resin colored layer 13 in the color filter 11 described above, the resin colored layer 15' is to make a voltage holding ratio of 80% or more, preferably 90% or more, and more preferably 95% or more and a residual DC ($\Delta E$) of 0.5 V or less, preferably 0.2 V or less and more preferably 0.1 V or less in the liquid crystal subjected to the treatment for extraction of impurities. Display insufficiencies such as sticking and white stain can thereby be prevented even under severe display conditions such as display for a long time or at high temperature and under high humidity, and a liquid crystal display excellent in display qualities is thus realized.

In the resin colored film 15', a red pattern 15'R, a green pattern 15'G and a blue pattern 15'B are arranged in a desired pattern and shape, and can be formed not only by pigment dispersion using a photosensitive resin containing a desired coloring material, but also by known methods such as printing, transfer etc. Further, the resin colored film 15' is formed such that its thickness is increased e.g. in the order of from the red pattern 15'R, the green pattern 15'G and the blue pattern 15'B, whereby the resin colored film 15' can set the optimum thickness of the liquid crystal layer for each color.

[Color Filter of Second Aspect of the Invention]

Figure 4:
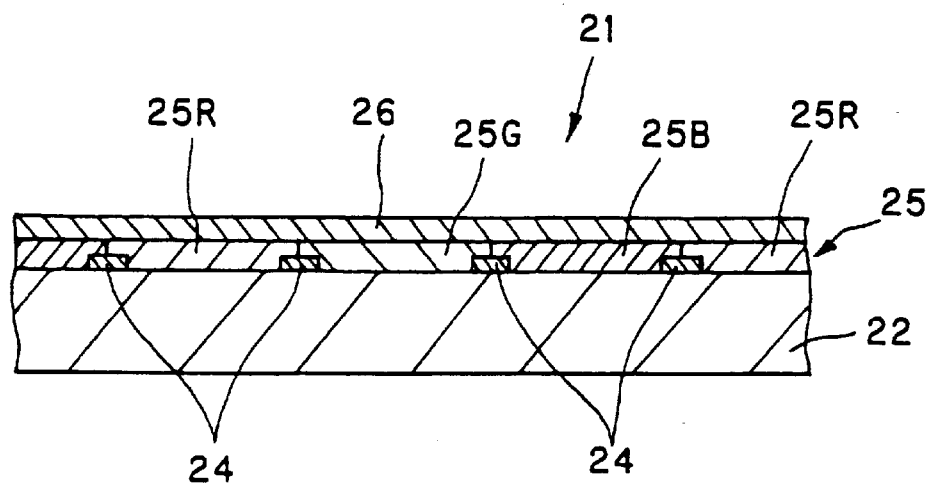
FIG. 4 is a schematic sectional view of another embodiment of the color filter of the present invention.

FIG. 4 is a schematic sectional view showing one embodiment of a color filter of the second aspect of the invention. In FIG. 4, a color filter 21 of the present invention is provided with a substrate 22, a black matrix 24 and a colored layer 25 formed on the substrate 22, and a transparent resin protective layer 26 to cover the black matrix 24 and the colored layer 25.

For use in a liquid crystal display, the color filter 21 is provided on the resin protective layer 26 with a common transparent electrode layer or an orientation layer, where among the resin members, the resin protective layer 26 is positioned nearest to a liquid crystal. The resin protective layer 26 is to make a voltage holding ratio of 80% or more, preferably 90% or more, and more preferably 95% or more and a residual DC ($\Delta E$) of 0.5 V or less, preferably 0.2 V or less, and more preferably 0.1 V or less in the liquid crystal subjected to the treatment for extraction of impurities. For the same reason described for the resin colored layer 13 in the color filter 11 described above, display insufficiencies such as sticking and white stain can thereby be prevented even under severe display conditions such as display for a long time or at high temperature and under high humidity, and a liquid crystal display excellent in display qualities is thus realized.

The substrate 22 constituting the color filter 21 can be the same as the substrate 12 constituting the color filter 11 described above.

The black matrix 24 constituting the color filter 21 may be formed by forming a metal film such as chromium with a thickness of about 1000 to 2000 Å by sputtering, vacuum deposition etc. and then patterning this film, or by forming a resin layer such as polyimide resin, acryl resin, epoxy resin etc. containing light-shading particles such as carbon fine particles and then patterning this resin layer, or by forming a photosensitive resin layer containing light-shading particles such as carbon fine particles, metal oxide etc., and then patterning this photosensitive resin layer.

In the present invention, the color filter 21 described above may not be provided with the black matrix 24.

In the resin colored film 25, a red pattern 25R, a green pattern 25G and a blue pattern 25B are arranged in a desired pattern and shape, and can be formed not only by pigment dispersion using a photosensitive resin containing a desired coloring material, but also by known methods such as printing, electrodeposition, transfer etc. Further, the colored layer 25 is formed such that its thickness is increased e.g. in the order of from the red pattern 25R, the green pattern 25G and the blue pattern 25B, whereby the colored layer 25 can set the optimum thickness of the liquid crystal layer for each color.

The resin protective layer 26 is provided to flatten the surface of the color filter 21 and to prevent components contained in the colored layer 25 from being eluted into the liquid crystal layer, and for use in a liquid crystal display, the color filter 21 is formed to cover at least the black matrix 24 and the colored layer 25 in contact with the liquid crystal layer. The resin protective layer 26 can be formed from resin materials such as acryl copolymers so that it has the above-described characteristics (a voltage holding ratio of 80% or more and a residual DC ($\Delta E$) of 0.5 V or less in the liquid crystal subjected to the treatment for extraction of impurities). The thickness of the resin protective layer 26 can be selected in consideration of the light transmittance of the material used, the surface conditions of the color filter 21, and for example, the thickness can be selected in the range of 0.1 to 3.0 $\mu$m.

[Color Filter of Third Aspect of the Invention]

Figure 5:
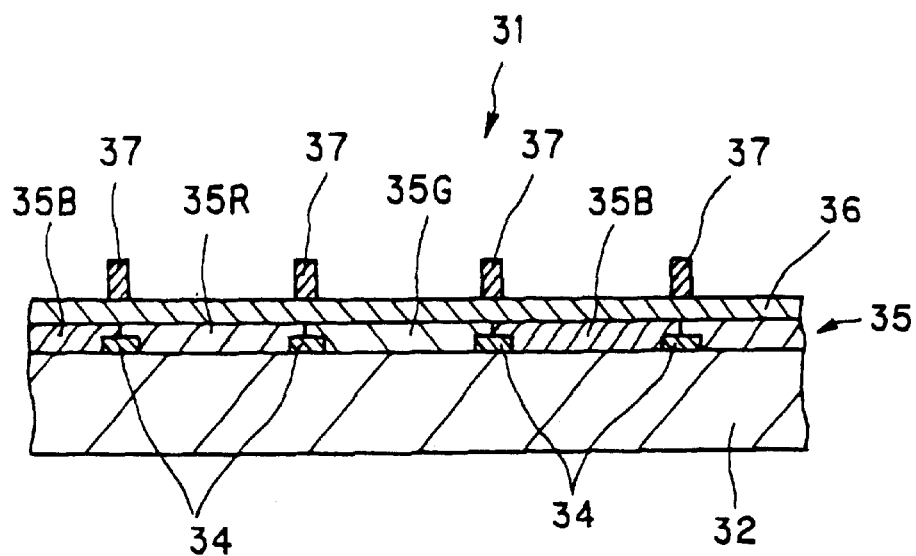
FIG. 5 is a schematic sectional view of another embodiment of the color filter of the present invention.

FIG. 5 is a schematic sectional view showing one embodiment of the color filter of the third aspect of the invention. In FIG. 5, a color filter 31 of the present invention is provided with a substrate 32, a black matrix 34 and a colored layer 35 formed on the substrate 32, and a transparent resin protective layer 36 to cover the black matrix 34 and the colored layer 35, and further the transparent resin pillar-shaped convexes 37 are formed in a plurality of predetermined regions in the black matrix 34, to protrude from the resin protective layer 36 described above.

For use in a liquid crystal display, the color filter 31 is provided on the resin protective layer 36 with a common transparent electrode layer or an orientation layer, where among the resin members, the resin protective layer 36 and the resin pillar-shaped convexes 37 are positioned nearest to, or brought into contact with, a liquid crystal. The resin protective layer 36 and the resin pillar-shaped convexes 37 are to make a voltage holding ratio of 80% or more, preferably 90% or more, and more preferably 95% or more and a residual DC ($\Delta E$) of 0.5 V or less, preferably 0.2 V or less, and more preferably 0.1 V or less in the liquid crystal subjected to the treatment for extraction of impurities. For the same reason described for the resin colored layer 13 in the color filter 11 described above, display insufficiencies such as sticking and white stain can thereby be prevented even under severe display conditions such as display for a long time or at high temperature and under high humidity, and a liquid crystal display excellent in display qualities is thus realized.

The substrate 32 constituting the color filter 31 can be the same as the substrate 12 constituting the color filter 11 described above.

The black matrix 34 constituting the color filter 31, and the colored layer 35, may be the same as the black matrix 24 constituting the color filter 21 described above, and the colored layer 25. The color filter 31 may not be provided with the black matrix 34.

The resin protective layer 36 constituting the color filter 31 may be the resin protective layer 26 constituting the color filter 21 described above.

The resin pillar-shaped convex 37 constituting the color filter 31 acts as a column-shaped spacer when the color filer 31 is attached to the opposite electrode substrate, and as a protrusion for controlling orientation of liquid crystal molecules in a vertical alignment type liquid crystal display. The resin pillar-shaped convex 37 can be formed by e.g. applying a photosensitive resin coating, exposure thereof in a predetermined pattern, and development and curing thereof. When using as a column-shaped spacer, the resin pillar-shaped convex 37 has a predetermined height to protrude in the range of about 2 to 10 $\mu$m from the resin protective layer 36 described above, and this protrusion can be suitably determined depending on the required thickness of the liquid crystal layer in the liquid crystal display. Further, the distribution of the resin pillar-shaped convexes 37 formed can be suitably determined in consideration of the uneven thickness and the degree of opening of the liquid crystal layer, the shape and material of the pillar-shaped convex 37, and for example, one resin pillar-shaped convex is formed per a set of a red pattern 35R, a green pattern 35G and a blue pattern 35B constituting the colored layer 35, in order to exhibit sufficient performance as the spacer. The shape of the resin pillar-shaped convex 37 is not particularly limited, and may be cylindrical, square pillar-shaped, top-cut cone-shaped, pyramid-shaped, and hemisphere-shaped.

The resin pillar-shaped convex 37 can be formed from resin materials such as acryl copolymers so that it has the above-described characteristics (a voltage holding ratio of 80% or more and a residual DC ($\Delta E$) of 0.5 V or less in the liquid crystal subjected to the treatment for extraction of impurities).

Liquid Crystal Display

Hereinafter, the liquid crystal display of the present invention is described.

[Liquid Crystal Display of First Aspect of the Invention]

Figure 6:
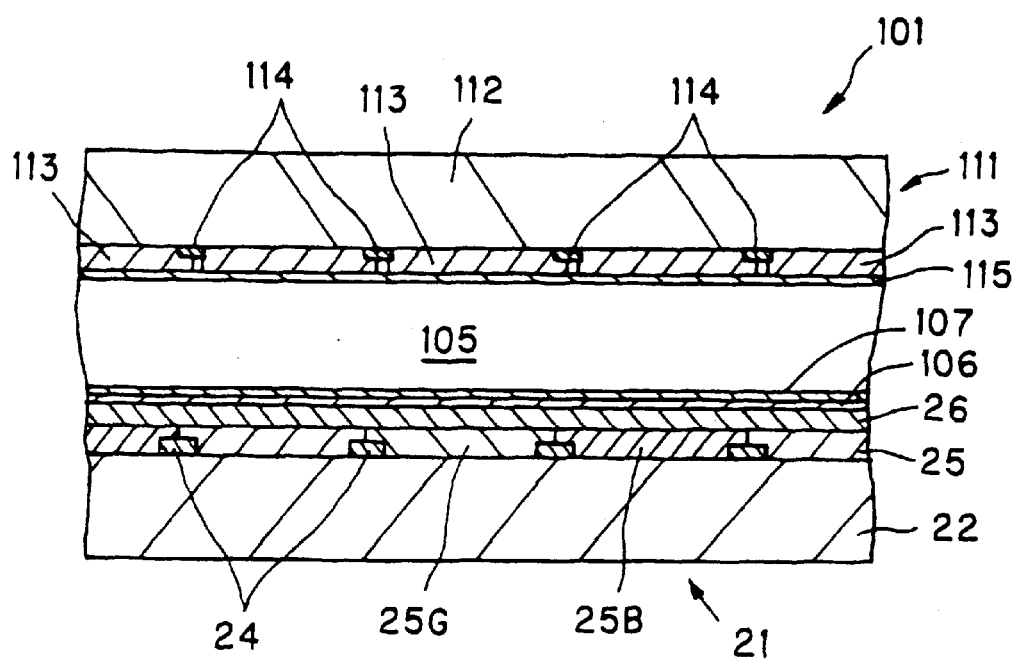
FIG. 6 is a schematic sectional view of one embodiment of a liquid crystal display of the present invention.

FIG. 6 is a schematic sectional view showing one embodiment of the liquid crystal display of the first aspect of the invention. In a liquid crystal display 101 in FIG. 6, the color filter 21 is opposed via a predetermined gap to an opposite electrode substrate 111, their surrounding part is sealed with a sealing member (not shown), and a liquid crystal layer 105 is formed in the gap. Although not shown in the drawing, a polarizing plate is arranged outside of each of the color filter 21 and the opposite electrode substrate 111.

The color filter 21 constituting the liquid crystal display 101 of the present invention is the color filter 21 of the present invention described above. Accordingly, the resin protective layer 26 constituting the color filter 21 has the above-described characteristics (a voltage holding ratio of 80% or more and a residual DC ($\Delta E$) of 0.5 V or less in the liquid crystal subjected to the treatment for extraction of impurities). Further, a common transparent electrode layer 106 for driving the liquid crystal, and an orientation layer 107, are formed on the resin protective layer 26 in the color filter 21.

On the other hand, the opposite electrode substrate 111 constituting the liquid crystal display 101 of the present invention is provided with a transparent picture element electrode 113 for driving the liquid crystal and a thin film transistor (TFT) 114 on a transparent substrate 112, and an orientation layer 115 is formed to cover a transparent picture element electrode 113. The opposite electrode substrate 111 is provided with a gate wire group (not shown) for opening and closing the thin film transistor (TFT) 114, a signal wire group (not shown) for feeding picture signals, and a voltage feeding wire (not shown) to the common transparent electrode layer 106 at the side of the color filter 21. These lead wires are usually composed of metals such as aluminum etc. formed in a process for producing the thin film transistor (TFT) 114.

As the transparent substrate 112 constituting the opposite electrode substrate 111 described above, the substrate 12 for the color filter described above can be used.

The common transparent electrode layer 106 constituting the liquid crystal display 101, and the transparent picture element electrode layer 113, are formed by general film making methods such as sputtering, vacuum deposition, CVD etc. using indium tin oxide (ITO), zinc oxide (ZnO), tin oxide (SnO) etc. and alloys thereof. The thickness of such an electrode layer is about 0.01 to 1 $\mu$m, and its action of preventing impurities generated from the member positioned outside thereof from transferring to the liquid crystal layer 105 can hardly be expected.

The orientation layers 107 and 115 constituting the liquid crystal display 101 can be formed from organic compounds of polyimide type, polyamide type, polyurethane type and polyurea type, and the thickness can be made about 0.01 to 1 $\mu$m. Such orientation layers 107 and 115 are applied by various printing methods or known coating methods, then baked and subjected to orientation treatment (rubbing). The orientation layers 107 and 115 made of such organic compounds are very thin so that the contamination of the liquid crystal layer 105 with impurities as a cause of insufficient display may not be considered, and simultaneously their action of preventing impurities generated from the member positioned outside thereof from transferring to the liquid crystal layer 105 can hardly be expected.

The liquid crystal layer 105 constituting the liquid crystal display 101 can be formed by using a liquid crystal which before the treatment of extraction of impurities as described above, has a voltage holding ratio of 95% or more and a residual DC ($\Delta E$) of 0.05 V or less as determined under the conditions for measurement of voltage holding ratio and residual DC ($\Delta E$) as described above.

In the liquid crystal display 101 of the present invention, the rein member brought into direct contact with the liquid crystal layer 105 or positioned nearest to the liquid crystal layer 105 via a film such as an orientation layer or a transparent electrode is only the resin protective layer 26 constituting the color filter 21. As described above, the resin protective layer 26 is to make a voltage holding ratio of 80% or more, preferably 90% or more and more preferably 95% or more and a residual DC (ΔE) of 0.5 V or less, preferably 0.2 V or less and more preferably 0.1 V or less in the liquid crystal subjected to the treatment for extraction of impurities. Even under severe display conditions such as display for a long time at high temperature and under high humidity, the liquid crystal display 101 thereby prevents occurrence of display insufficiencies such as sticking and white stain and is excellent in display qualities.

Although the liquid crystal display 101 described above makes use of the color filter 21 of the present invention, the color filters 11, 11' and 31 of the present invention described above can also be used as the color filter.

[Liquid Crystal Display of Second Aspect of the Invention]

Figure 7:
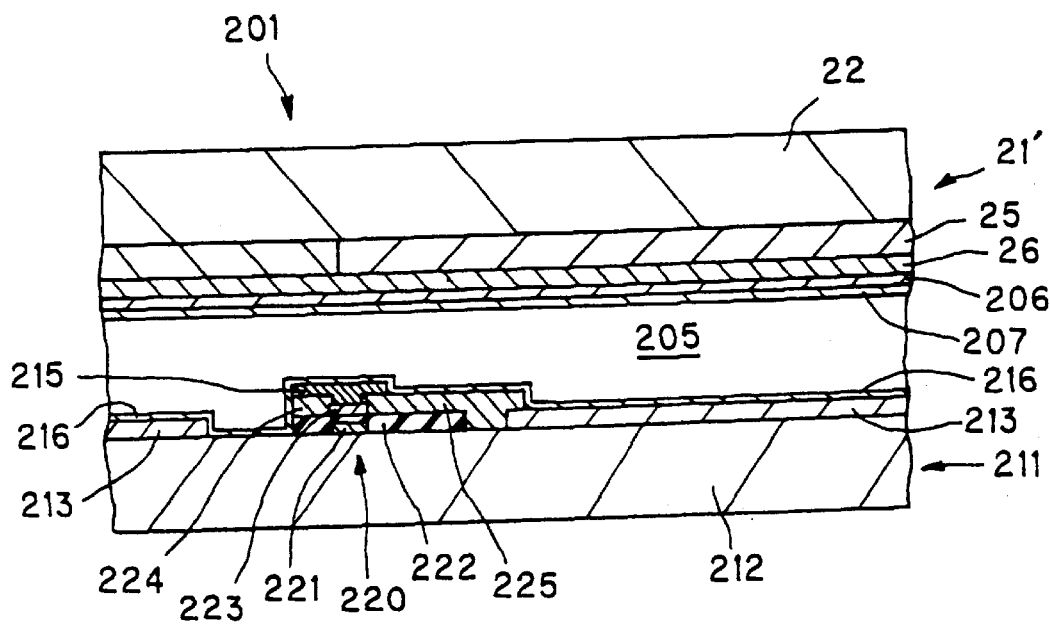
FIG. 7 is a schematic sectional view of another embodiment of the liquid crystal display of the present invention.

FIG. 7 is a schematic sectional view showing one embodiment of the liquid crystal display of the second aspect of the invention. In a liquid crystal display 201 in FIG. 7, a color filter 21' is opposed via a predetermined gap to an opposite electrode substrate 211, their surrounding part is sealed with a sealing member (not shown), and a liquid crystal layer 205 is formed in the gap. Although not shown in the drawing, a polarizing plate is arranged outside of each of the color filter 21' and the opposite electrode substrate 211.

The color filter 21' constituting the liquid crystal display 201 of the present invention is the same as the color filter 21 of the present invention described above except that it is not provided with the black matrix 24, and the same number is assigned to the same member. Accordingly, the resin protective layer 26 constituting the color filter 21' has the above-described characteristics (a voltage holding ratio of 80% or more and a residual DC (ΔE) of 0.5 V or less in the liquid crystal subjected to the treatment for extraction of impurities). The common transparent electrode layer 206 for driving the liquid crystal, and the orientation layer 207, are formed on the resin protective layer 26 in the color filter 21'.

On the other hand, an opposite electrode substrate 211 constituting the liquid crystal display 201 of the present invention is provided with a semiconductor driving element 220 formed integrally with a transparent substrate 212, a transparent picture element electrode 213, a resin shading layer 215 formed on a semiconductor driving element 220, and an orientation layer 216 formed to cover the transparent picture element electrode 213, the semiconductor driving element 220 and the resin shading layer 215.

A semiconductor driving element 220 is a thin film transistor (TFT) composed of a gate electrode 221, a gate insulating film 222, a semiconductor layer 223 such as amorphous silicon, a source electrode 224, and a drain electrode 225. One end of the drain electrode 225 is connected to the semiconductor layer 223, and the other end is connected to the transparent picture element electrode 213.

The resin shading layer 215 described above is formed on the source electrode 224 and the drain electrode 225 to shield the semiconductor layer 223 from light, and it has the action of suppressing a light leak current in the semiconductor driving element 220. The resin shading layer 215 is a resin member in contact with the liquid crystal layer 205 via the orientation layer 216 in the liquid crystal display 201, and in the present invention, the resin shading layer 215 is to make a voltage holding ratio of 80% or more, preferably 90% or more and more preferably 95% or more and a residual DC (ΔE) of 0.5 V or less, preferably 0.2 V or less and more preferably 0.1 V or less in the liquid crystal subjected to treatment for extraction of impurities.

The resin shading layer 215 may be formed by forming a photosensitive resin layer containing insulating shading particles such as Cu—Fe—Mn composite oxides and then patterning this photosensitive resin layer.

As the transparent substrate 212 constituting the opposite electrode substrate 211 described above, the substrate 12 for the color filter described above can be used.

The common transparent electrode layer 206 constituting the liquid crystal display 201, and the transparent picture element electrode layer 213, are formed by general film making methods such as sputtering, vacuum deposition, CVD etc. using indium tin oxide (ITO), zinc oxide (ZnO), tin oxide (SnO) etc. and alloys thereof. The thickness of such an electrode layer is about 0.01 to 1 μm, and its action of shielding the liquid crystal layer from impurities can hardly be expected.

The orientation layers 207 and 216 constituting the liquid crystal display 201 can be formed from organic compounds of polyimide type, polyamide type, polyurethane type and polyurea type, and the thickness can be made about 0.01 to 1 μm. Such orientation layers 207 and 216 are applied by various printing methods or known coating methods, then baked and subjected to orientation treatment (rubbing). The orientation layers 207 and 216 made of such organic compounds are very thin so that the contamination of the liquid crystal layer 205 with impurities as a cause of insufficient display may not be considered, and simultaneously the action of such orientation layers 207 and 216 in shielding the liquid crystal layer from impurities can hardly be expected.

The liquid crystal layer 205 constituting the liquid crystal display 201 can be formed by using a liquid crystal which before the treatment of extraction of impurities as described above, has a voltage holding ratio of 95% or more and a residual DC (ΔE) of 0.05 V or less as determined under the conditions for measurement of voltage holding ratio and residual DC (ΔE) as described above.

In the liquid crystal display 201 of the present invention, the rein members brought into direct contact with the liquid crystal layer 205 or positioned nearest to the liquid crystal layer 205 via a film such as an orientation layer or a transparent electrode are only the resin protective layer 26 constituting the color filter 21' and the resin shading layer 215 on the opposite electrode substrate 211. As described above, the resin protective layer 26 and the resin shading layer 215 are to make a voltage holding ratio of 80% or more, preferably 90% or more and more preferably 95% or more and a residual DC (ΔE) of 0.5 V or less, preferably 0.2 V or less and more preferably 0.1 V or less in the liquid crystal subjected to the treatment for extraction of impurities. Even under severe display conditions such as display for a long time at high temperature and under high humidity, the liquid crystal display 201 thereby prevents occurrence of display insufficiencies such as sticking and white stain and is excellent in display qualities.

Although the liquid crystal display 201 described above makes use of the color filter 21' of the invention not provided with the black matrix, the color filters 11, 11', 21 and 31 of the present invention described above or the color filters 11, 11' and 31 from which the black matrix was removed can also be used.

[Liquid Crystal Display of Third Aspect of the Invention]

Figure 8:
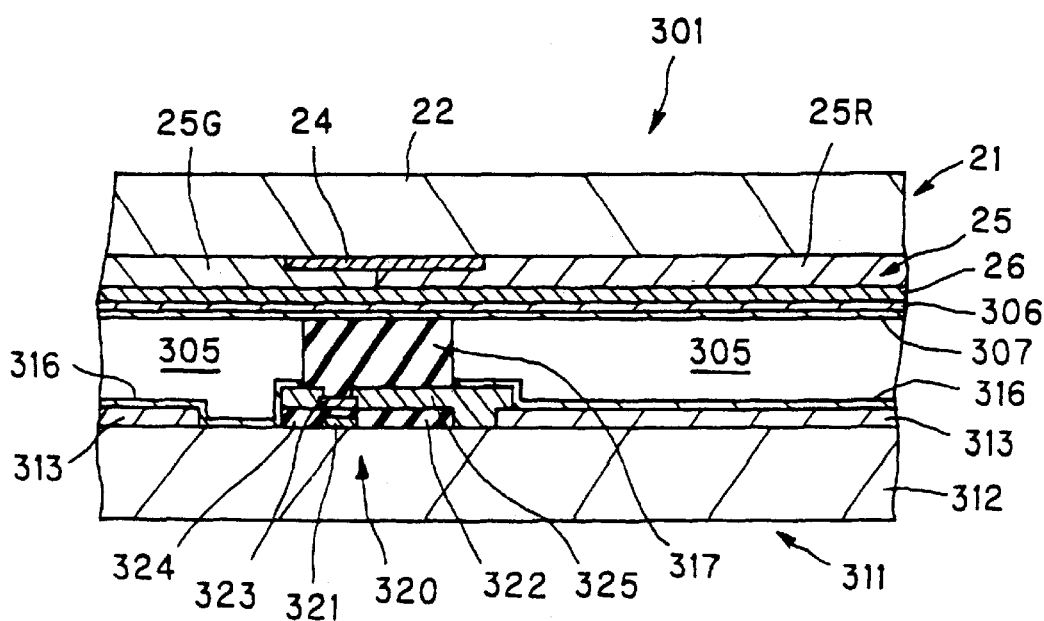
FIG. 8 is a schematic sectional view of another embodiment of the liquid crystal display of the present invention.

FIG. 8 is a schematic sectional view showing one embodiment of the liquid crystal display of the third aspect of the invention. In a liquid crystal display 301 in FIG. 8, a color filter 21 is opposed via a predetermined gap to an opposite electrode substrate 311, their surrounding part is sealed with a sealing member (not shown), and a liquid crystal layer 305 is formed in the gap. Although not shown in the drawing, a polarizing plate is arranged outside of each of the color filter 21 and the opposite electrode substrate 311.

The color filter 21 constituting the liquid crystal display 301 of the present invention is the same as the color filter 21 of the present invention described above, and the same number is assigned to the same member. Accordingly, the resin protective layer 26 constituting the color filter 21 has the above-described characteristics (a voltage holding ratio of 80% or more and a residual DC ($\Delta E$) of 0.5 V or less in the liquid crystal subjected to the treatment for extraction of impurities). A common transparent electrode layer 306 for driving the liquid crystal, and an orientation layer 307, are formed on the resin protective layer 26 in the color filter 21.

On the other hand, an opposite electrode substrate 311 constituting the liquid crystal display 301 of the present invention is provided with a semiconductor driving element 320 formed integrally with a transparent substrate 312, a transparent picture element electrode 313, a resin pillar-shaped convex 317 formed on the semiconductor driving element 320, and an orientation layer 316 formed to cover the transparent picture element electrode 313 and the semiconductor driving element 320.

The semiconductor driving element 320 has the same structure as the semiconductor driving element 220 as described above, and is a thin film transistor (TFT) composed of a gate electrode 321, a gate insulating film 322, a semiconductor layer 323 such as amorphous silicon, a source electrode 324, and a drain electrode 325. One end of the drain electrode 325 is connected to the semiconductor layer 323, and the other end is connected to the transparent picture element electrode 313.

The resin pillar-shaped convex 317 described above is formed over the semiconductor layer 323, the source electrode 324 and the drain electrode 325, and acts as a spacer when it is attached to the color filer 21. The resin pillar-shaped convex 317 has a predetermined height in the range of about 2 to 10 $\mu$m, and the height of the resin pillar-shaped convex 317 can be suitably determined depending on the required thickness of the liquid crystal layer in the liquid crystal display. Further, the distribution of the resin pillar-shaped convexes 317 formed can be suitably determined in consideration of the uneven thickness and the degree of opening of the liquid crystal layer, the shape and material of the pillar-shaped convex 317, and for example, one resin pillar-shaped convex is formed per a set of the red pattern 25R, the green pattern 25G and the blue pattern 25B constituting the colored layer 25 in the color filter 21, in order to exhibit sufficient performance as the spacer. The shape of the resin pillar-shaped convex 317 is not particularly limited, and may be cylindrical, square pillar-shaped, and top-cut cone-shaped.

In the present invention, the resin pillar-shaped convex 317 is to make a voltage holding ratio of 80% or more, preferably 90% or more and more preferably 95% or more and a residual DC ($\Delta E$) of 0.5 V or less, preferably 0.2 V or less and more preferably 0.1 V or less in the liquid crystal subjected to treatment for extraction of impurities.

The resin pillar-shaped convex 317 can be formed by use of the resin materials mentioned for the resin pillar-shaped convex 37 in the color filter 31 described above.

As the transparent substrate 312 constituting the opposite electrode substrate 311 described above, the substrate 12 for the color filter described above can be used.

The common transparent electrode layer 306 constituting the liquid crystal display 301, and the transparent picture element electrode layer 313, are formed by general film making methods such as sputtering, vacuum deposition, CVD etc. using indium tin oxide (ITO), zinc oxide (ZnO), tin oxide (SnO) etc. and alloys thereof. The thickness of such an electrode layer is about 0.01 to 1 $\mu$m, and its action of shielding the liquid crystal layer from impurities can hardly be expected.

The orientation layers 307 and 316 constituting the liquid crystal display 301 can be the same as the orientation layers 207 and 216 constituting the liquid crystal display 201 described above.

The liquid crystal layer 305 constituting the liquid crystal display 301 can be formed by using a liquid crystal which before the treatment of extraction of impurities as described above, has a voltage holding ratio of 95% or more and a residual DC ($\Delta E$) of 0.05 V or less as determined under the conditions for measurement of voltage holding ratio and residual DC ($\Delta E$) as described above.

In the liquid crystal display 301 of the present invention, the rein members brought into direct contact with the liquid crystal layer 305 or positioned nearest to the liquid crystal layer 305 via a film such as an orientation layer or a transparent electrode are only the resin protective layer 26 constituting the color filter 21 and the resin pillar-shaped convex 317 on the opposite electrode substrate 311. As described above, the resin protective layer 26 and the resin pillar-shaped convex 317 are to make a voltage holding ratio of 80% or more, preferably 90% or more and more preferably 95% or more and a residual DC ($\Delta E$) of 0.5 V or less, preferably 0.2 V or less and more preferably 0.1 V or less in the liquid crystal subjected to the treatment for extraction of impurities. Even under severe display conditions such as display for a long time at high temperature and under high humidity, the liquid crystal display 301 thereby prevents occurrence of display insufficiencies such as sticking and white stain and is excellent in display qualities.

Although the liquid crystal display 301 described above makes use of the color filter 21 of the invention, the color filters 11 and 11' of the present invention described above, or the color filters 11, 11' and 21 from which the black matrix was removed, can also be used.

[Liquid Crystal Display of Fourth Aspect of the Invention]

Figure 9:
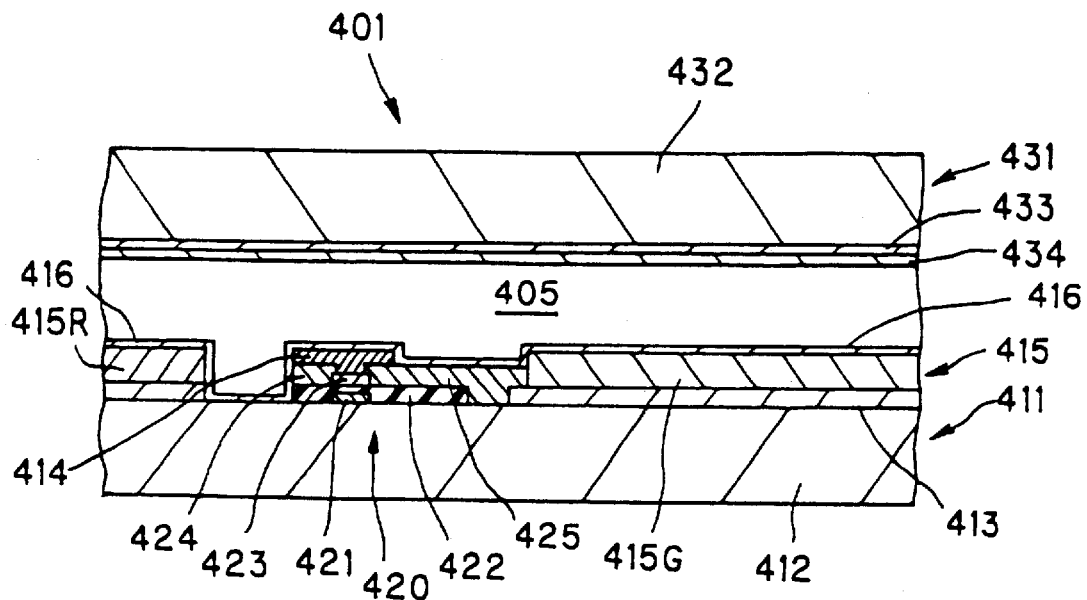
FIG. 9 is a schematic sectional view of another embodiment of the liquid crystal display of the present invention.

FIG. 9 is a schematic sectional view showing one embodiment of the liquid crystal display of the fourth aspect of the invention. In a liquid crystal display 401 in FIG. 9, an opposite electrode substrate 411 is opposed via a predetermined gap to a common electrode substrate 431, their surrounding part is sealed with a sealing member (not shown), and a liquid crystal layer 405 is formed in the gap. Although not shown in the drawing, a polarizing plate is arranged outside of each of the opposite electrode substrate 411 and the common electrode substrate 431.

The opposite electrode substrate 411 constituting a liquid crystal display 401 of the present invention is provided with a semiconductor driving element 420 formed integrally with a transparent substrate 412, a transparent picture element electrode 413, a resin shading layer 414 formed on the semiconductor driving element 420, a resin colored layer 415 formed on the transparent picture element electrode 413, and an orientation layer 416 formed to cover the transparent picture element electrode 413, the resin shading layer 414, the resin colored layer 415 and the semiconductor driving element 420.

The semiconductor driving element 420 has the same structure as that of the semiconductor driving element 220 as described above, and is a thin film transistor (TFT) composed of a gate electrode 421, a gate insulating film 422, a semiconductor layer 423 such as amorphous silicon, a source electrode 424, and a drain electrode 425. One end of the drain electrode 425 is connected to the semiconductor layer 423, and the other end is connected to the transparent picture element electrode 413.

The resin shading layer 414 is the same as the resin shading layer 215 in the liquid display 201 described above, and is formed on the source electrode 424 and the drain electrode 425 to shield the semiconductor layer 423 from light, and it has the action of suppressing a light leak current in the semiconductor driving element 420. The resin shading layer 414 also has the above-described characteristics (a voltage holding ratio of 80% or more and a residual DC ($\Delta E$) of 0.5 V or less in the liquid crystal subjected to the treatment for extraction of impurities), and it can be formed in the same manner as for the resin shading layer 215.

The resin colored layer 415 on the opposite electrode substrate 411 is formed to cover each transparent picture element electrode 413, and a red pattern 415R, a green pattern 415G and a blue pattern (not shown) are arranged in a desired pattern and shape for each picture element electrode. The resin colored layer 415 can be formed by pigment dispersion using a photosensitive resin containing a desired coloring material, but also by known methods such as printing, transfer etc. Further, the resin colored layer 415 may be formed such that its thickness is increased e.g. in the order of from the red pattern, the green pattern and the blue pattern, whereby the resin colored layer can set the optimum thickness of the liquid crystal layer for each color.

In the liquid crystal display 401, the resin colored layer 415 is to make a voltage holding ratio of 80% or more and a residual DC ($\Delta E$) of 0.5 V or less in the liquid crystal subjected to the treatment for extraction of impurities. The colored layer 415 can be formed from the resin materials mentioned for the colored film 15 in the color filter 11 described above.

As the transparent substrate 412 constituting the opposite electrode substrate 411 described above, the substrate 12 for the color filter described above can be used.

On the other hand, the common electrode substrate 431 constituting the liquid crystal display 401 of the present invention is provided on a transparent substrate 432 with a common transparent electrode 433 and an orientation layer 434. As the transparent substrate 432, the substrate 12 for the color filter described above can be used.

The transparent picture element electrode 413 constituting the liquid crystal display 401, and the common transparent electrode layer 433, are formed by general film making methods such as sputtering, vacuum deposition, CVD etc. using indium tin oxide (ITO), zinc oxide (ZnO), tin oxide (SnO) etc. and alloys thereof. The thickness of such an electrode layer is about 0.01 to 1 $\mu$m, and its action of shielding the liquid crystal layer from impurities can hardly be expected.

The orientation layers 416 and 434 constituting the liquid crystal display 401 can be the same as the orientation layers 207 and 216 constituting the liquid crystal display 201 described above.

The liquid crystal layer 405 constituting the liquid crystal display 401 can be formed by using a liquid crystal which before the treatment of extraction of impurities as described above, has a voltage holding ratio of 95% or more and a residual DC ($\Delta E$) of 0.05 V or less as determined under the conditions for measurement of voltage holding ratio and residual DC ($\Delta E$) as described above.

In the liquid crystal display 401 of the present invention, the rein members brought into direct contact with the liquid crystal layer 405 or positioned nearest to the liquid crystal layer 405 via a film such as an orientation layer or a transparent electrode are only the resin shading layer 414 and the resin colored layer 415 over the opposite electrode substrate 411. As described above, the resin shading layer 414 and the resin colored layer 415 are to make a voltage holding ratio of 80% or more, preferably 90% or more and more preferably 95% or more and a residual DC ($\Delta E$) of 0.5 V or less, preferably 0.2 V or less and more preferably 0.1 V or less in the liquid crystal subjected to the treatment for extraction of impurities. Even under severe display conditions such as display for a long time at high temperature and under high humidity, the liquid crystal display 401 thereby prevents occurrence of display insufficiencies such as sticking and white stain and is excellent in display qualities.

[Liquid Crystal Display in the Fifth Aspect of the Invention]

Figure 10:
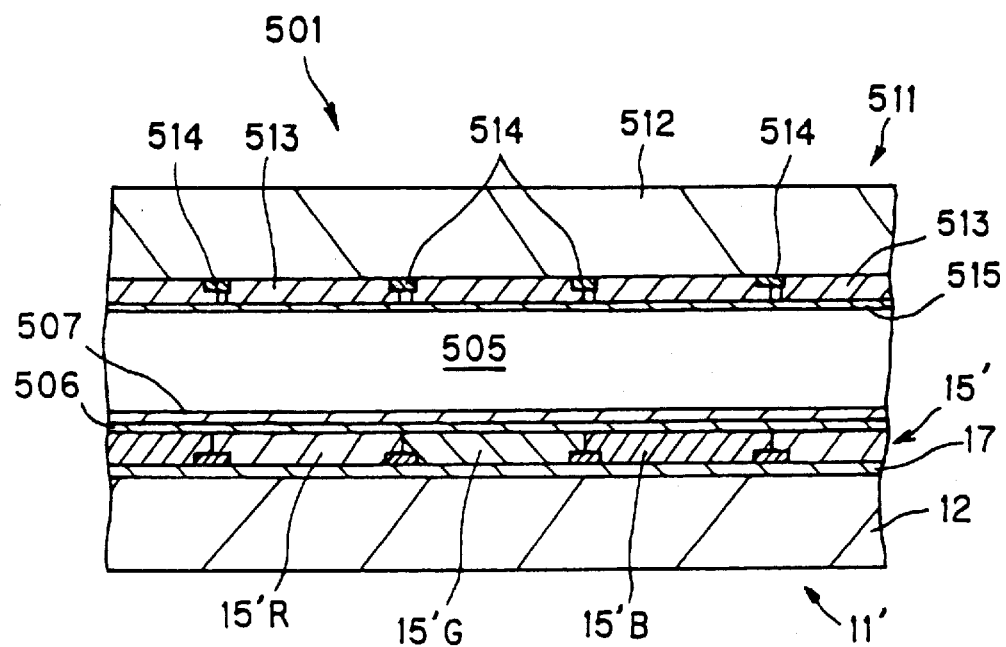
FIG. 10 is a schematic sectional view of another embodiment of the liquid crystal display of the present invention.

FIG. 10 is a schematic sectional view showing one embodiment of the liquid crystal display in the fifth aspect of the invention. A liquid crystal display 501 in FIG. 10 is a reflection-type liquid crystal display wherein the color filter 11' is opposed via a predetermined gap to an opposite electrode substrate 511, their surrounding part is sealed with a sealing member (not shown), and a liquid crystal layer 505 is formed in the gap. Although not shown in the drawing, a phase difference plate and a polarizing plate are arranged outside of the opposite electrode substrate 511 at the side of the observer.

The color filter 11' constituting the liquid crystal display 501 of the present invention is the same as the color filter 11' of the present invention described above except that the reflective layer 17 is arranged between the substrate 12 and the black matrix 14' or the resin colored layer 15', and the same number is assigned to the same member. Accordingly, the resin colored layer 15' constituting the color filter 11' has the above-described characteristics (a voltage holding ratio of 80% or more and a residual DC ($\Delta E$) of 0.5 V or less in the liquid crystal subjected to the treatment for extraction of impurities).

The reflective layer 17 constituting the color filter 11' can be prepared by forming a metal film such as aluminum by known film making means such as vacuum deposition, sputtering etc.

The common transparent electrode layer 506 for driving the liquid crystal, and the orientation layer 507, are formed on the resin colored layer 15' in the color filter 11'.

On the other hand, the opposite electrode substrate 511 constituting the liquid crystal display 501 of the present invention is provided on a transparent substrate 512 with a transparent picture element electrode 513 for driving a liquid crystal and the thin film transistor (TFT) 514, and an orientation layer 515 is formed to cover the transparent picture element electrode 513. The opposite electrode substrate 511 is provided with a gate wire group (not shown) for opening and closing the thin film transistor (TFT) 514, a signal wire group (not shown) for feeding picture signals, and a voltage feeding wire (not shown) to a common transparent electrode layer 506 at the side of the color filter 11'. These lead wires are usually composed of metals such as aluminum etc. formed in a process for producing the thin film transistor (TFT) 514.

As the transparent substrate 512 constituting the opposite electrode substrate 511 described above, the substrate 12 for the color filter described above can be used.

The common transparent electrode layer 506 constituting the liquid crystal display 501, and the transparent picture element electrode layer 513, are formed by general film making methods such as sputtering, vacuum deposition, CVD etc. using indium tin oxide (ITO), zinc oxide (ZnO), tin oxide (SnO) etc. and alloys thereof. The thickness of such an electrode layer is about 0.01 to 1 $\mu$m, and its action of shielding the liquid crystal layer from impurities can hardly be expected.

The orientation layers 507 and 515 constituting the liquid crystal display 501 can be formed from organic compounds of polyimide type, polyamide type, polyurethane type and polyurea type, and the thickness can be made about 0.01 to 1 $\mu$m. Such orientation layers 507 and 515 are applied by various printing methods or known coating methods, then baked and subjected to orientation treatment (rubbing). The orientation layers 507 and 515 made of such organic compounds are very thin so that the contamination of the liquid crystal layer 505 with impurities as a cause of insufficient display may not be considered, and simultaneously the action of the orientation layers 107 and 515 in shielding the liquid crystal layer from impurities can hardly be expected.

The liquid crystal layer 505 constituting the liquid crystal display 501 can be formed by using a liquid crystal which before the treatment of extraction of impurities as described above, has a voltage holding ratio of 95% or more and a residual DC ($\Delta$E) of 0.05 V or less as determined under the conditions for measurement of voltage holding ratio and residual DC ($\Delta$E) as described above.

In the liquid crystal display 501 of the present invention, the rein member brought into direct contact with the liquid crystal layer 505 or positioned nearest to the liquid crystal layer 505 via a film such as an orientation layer or a transparent electrode is only the resin colored layer 15' constituting the color filter 11'. As described above, the resin colored layer 15' is to make a voltage holding ratio of 80% or more, preferably 90% or more and more preferably 95% or more and a residual DC ($\Delta$E) of 0.5 V or less, preferably 0.2 V or less and more preferably 0.1 V or less in the liquid crystal subjected to the treatment for extraction of impurities. Even under severe display conditions such as display for a long time at high temperature and under high humidity, the liquid crystal display 501 thereby prevents occurrence of display insufficiencies such as sticking and white stain and is excellent in display qualities.

Although the liquid crystal display 501 described above makes use of the color filter 11' of the present invention, the color filters 11, 21 and 31 of the invention provided with reflective layers can also be used.

[Liquid Crystal Display in the Sixth Aspect of the Invention]

Figure 11:
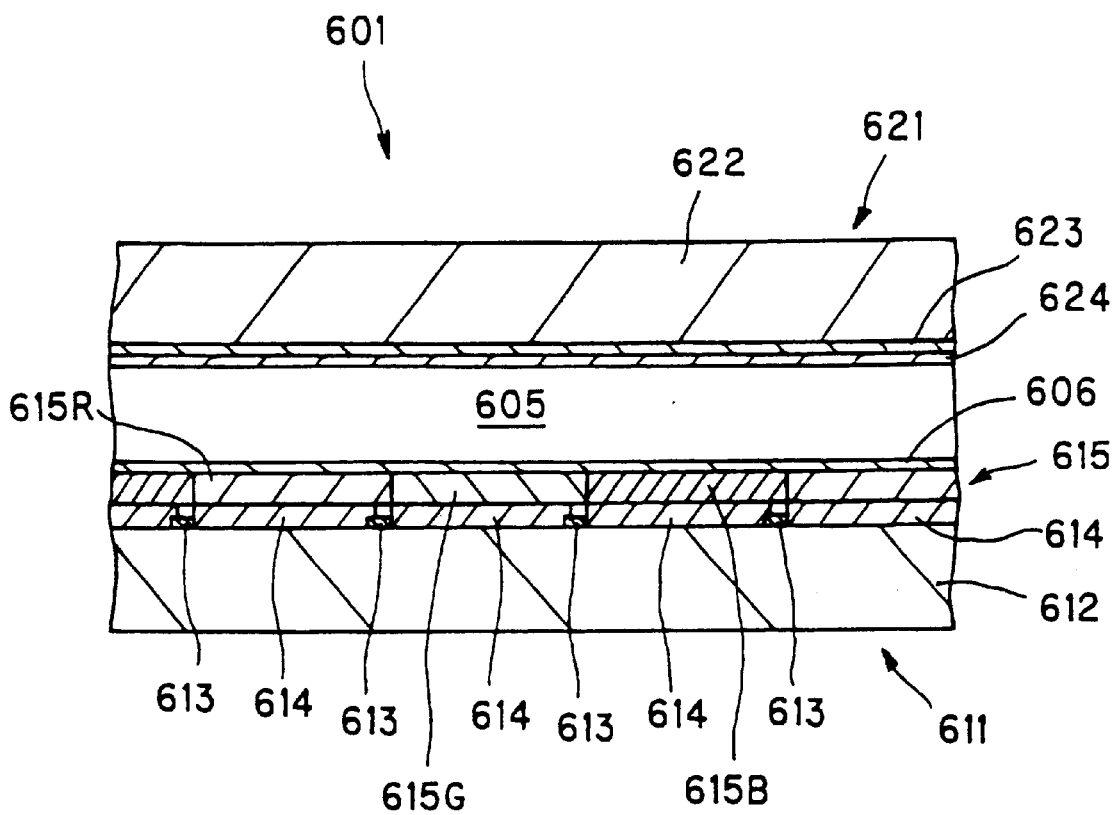
FIG. 11 is a schematic sectional view of another embodiment of the liquid crystal display of the present invention.

FIG. 11 is a schematic sectional view showing one embodiment of the liquid crystal display in the sixth aspect of the invention. A liquid crystal display 601 in FIG. 11 is a reflection-type liquid crystal display wherein a common electrode substrate 621 is opposed via a predetermined gap to an opposite electrode substrate 611, their surrounding part is sealed with a sealing member (not shown), and a liquid crystal layer 605 is formed in the gap. Although not shown in the drawing, a phase difference plate and a polarizing plate are arranged outside of the opposite electrode substrate 621 at the side of the observer.

The opposite electrode substrate 611 constituting the liquid crystal display 601 of the present invention is provided on a substrate 612 with a plurality of thin film transistors (TFT) 613 forming a liquid crystal-driving element layer and with a plurality of reflective picture element electrodes 614 forming a reflective electrode layer, and a resin colored layer 615 is formed to cover the respective reflective picture element electrodes 614, and further the orientation layer 606 is formed to cover the reflective picture element electrodes 614 and the resin colored layer 615.

The reflective picture element electrode 614 on the opposite electrode substrate 611 can be prepared by forming a metal film such as aluminum by known film making means such as vacuum deposition, sputtering etc. and then patterning it.

The resin colored layer 615 over the opposite electrode substrate 611 is formed to cover the respective reflective picture element electrodes 614, and a red pattern 615R, a green pattern 615G and a blue pattern 615B are formed in a desired pattern and shape for each reflective picture element electrode. The resin colored layer 615 can be formed not only by pigment dispersion using a photosensitive resin containing a desired coloring material, but also by known methods such as printing, transfer etc. Further, the resin colored layer 615 is formed such that its thickness is increased e.g. in the order of from the red pattern, the green pattern and the blue pattern, whereby the resin colored layer can set the optimum thickness of the liquid crystal layer for each color.

In the liquid crystal display 601, the resin colored layer 615 is to make a voltage holding ratio of 80% or more and a residual DC ($\Delta$E) of 0.5 V or less in the liquid crystal subjected to the treatment for extraction of impurities. The colored layer 615 can be formed from the resin materials mentioned for the colored film 15 in the color filter 11 described above.

As the substrate 612 constituting the opposite electrode substrate 611 described above, the substrate 12 for the color filter described above can be used.

On the other hand, the common electrode substrate 621 constituting the liquid crystal display 601 of the present invention is provided on a transparent substrate 622 with a common transparent electrode layer 623 and an orientation layer 624. As the transparent substrate 622, the substrate 12 for the color filter described above can be used. Further, the common transparent electrode layer 623 is formed by general film making methods such as sputtering, vacuum deposition, CVD etc. using indium tin oxide (ITO), zinc oxide (ZnO), tin oxide (SnO) etc. and alloys thereof. The thickness of such an electrode layer is about 0.01 to 1 $\mu$m, and its action of shielding the liquid crystal layer from impurities can hardly be expected.

The orientation layers 606 and 624 constituting the liquid crystal display 601 can be the same as the orientation layers 207 and 216 constituting the liquid crystal display 201 described above.

The liquid crystal layer 605 constituting the liquid crystal display 601 can be formed by using a liquid crystal which before the treatment of extraction of impurities as described above, has a voltage holding ratio of 95% or more and a residual DC ($\Delta$E) of 0.05 V or less as determined under the conditions for measurement of voltage holding ratio and residual DC ($\Delta$E) as described above.

In the liquid crystal display 601 of the present invention, the rein member brought into direct contact with the liquid crystal layer 605 or positioned nearest to the liquid crystal layer 605 via a film such as an orientation layer or a transparent electrode is only the resin colored layer 615 constituting the opposite electrode substrate 611. As described above, the resin colored layer 615 is to make a voltage holding ratio of 80% or more, preferably 90% or more and more preferably 95% or more and a residual DC (ΔE) of 0.5 V or less, preferably 0.2 V or less and more preferably 0.1 V or less in the liquid crystal subjected to the treatment for extraction of impurities. Even under severe display conditions such as display for a long time at high temperature and under high humidity, the liquid crystal display 601 thereby prevents occurrence of display insufficiencies such as sticking and white stain and is excellent in display qualities.

EXAMPLES

Hereinafter, the present invention is described in more detail by reference to the Examples.

Test in Treatment for Extraction of Impurities

A. Preparation of Samples

For subjection to the treatment for extraction of impurities, various materials used in color liquid crystal displays were used to form coatings on a glass substrate (7059 glass produced by Corning Co., Ltd.) as descried below.

(1) Photosensitive Coatings for the Black Matrix and Photosensitive Coatings for the Colored Layers Each of the photosensitive coatings for the black matrix and the photosensitive coatings R1, G1, G2 and B1 for the respective colored layers was prepared by adding beads to a dispersion composition (containing a pigment, a dispersant and a solvent), dispersing the mixture for 3 hours in a dispersing machine, removing the beads therefrom, and mixing the dispersion with a clear resist composition (a polymer, a monomer, an additive, an initiator and a solvent). Their compositions are shown below. A paint shaker was used as the dispersing machine.

Then, each of the photosensitive coating for the black matrix and the photosensitive coatings R1, G1, G2 and B1 for the respective colored layers thus prepared was applied by spin-coating onto the glass substrate to form a coating of 1.5 μm in thickness thereon, then pre-baked at 90° C. for 3 minutes, exposed as a whole (500 mJ/cm$^2$), spray-developed for 60 seconds with 0.05% aqueous KOH, and post-baked at 200° C. for 30 minutes to prepare the glass substrate with the coating.

| (Photosensitive coating for the black matrix) | |
|---|---|
| Black pigment | 14.0 parts by weight |
| (Black #9550 ™ produced by Dainichiseika Colour & Chemicals Mfg. Co., Ltd.) | |
| Dispersant ((Disperbyk 111, Big Chemie Co., Ltd.) | 1.2 parts by weight |
| Polymer (VR60, Showa Highpolymer Co., Ltd.) | 2.8 parts by weight |
| Monomer (SR399, Thertomer Co., Ltd.) | 3.5 parts by weight |
| Additive (L-20, Soken Kagaku Co., Ltd.) | 0.7 part by weight |
| Initiator | 1.6 parts by weight |
| (2-benzyl-2-dimethylamino-1-(4-morpholinophenyl)-butanone-1) | |
| Initiator | 0.3 part by weight |
| (4,4'-diethylaminobenzophenone) | |
| Initiator (2,4-diethylthioxanthone) | 0.1 part by weight |
| Solvent (ethylene glycol monobutyl ether) | 75.8 parts by weight |

| (Photosensitive coating R1 for red pattern) | |
|---|---|
| Red pigment | 4.8 parts by weight |
| (Chromophthal Red A2B, Ciba-Geigy Co.) | |
| Yellow pigment | 1.2 parts by weight |
| (Paliotol Yellow D1819, BASF AG) | |
| Dispersant (Solsperse 24000, Zeneca Co., Ltd.) | 3.0 parts by weight |

| -continued | |
|---|---|
| (Photosensitive coating R1 for red pattern) | |
| Monomer (SR399, Thertomer Co., Ltd.) | 4.0 parts by weight |
| Polymer 1 | 5.0 parts by weight |
| Initiator (Irugacure 907, Ciba-Geigy Co.) | 1.4 parts by weight |
| Initiator | 0.6 part by weight |
| (2,2'-bis(o-chlorophenyl)-4,5,4',5'-tetraphenyl-1,2'-biimidazole) | |
| Solvent | 80.0 parts by weight |
| (propylene glycol monomethyl ether acetate) | |

| (Photosensitive coating G1 for green pattern) | |
|---|---|
| Green pigment | 4.2 parts by weight |
| (Monastral Green 9Y-C, Zeneca Co., Ltd.) | |
| Yellow pigment | 1.8 parts by weight |
| (Paliotol Yellow D1819, BASF AG) | |
| Dispersant (Solsperse 24000, Zeneca Co., Ltd.) | 3.0 parts by weight |
| Monomer (SR399, Thertomer Co., Ltd.) | 4.0 parts by weight |
| Polymer 1 | 5.0 parts by weight |
| Initiator (Irugacure 907, Ciba-Geigy Co.) | 1.4 parts by weight |
| Initiator | 0.6 part by weight |
| (2,2'-bis(o-chlorophenyl)-4,5,4',5'-tetraphenyl-1,2'-biimidazole) | |
| Solvent | 80.0 parts by weight |
| (propylene glycol monomethyl ether acetate) | |

| (Photosensitive coating G2 for green pattern) | |
|---|---|
| Green pigment | 4.2 parts by weight |
| (Monastral Green 6Y-C, Zeneca Co., Ltd.) | |
| Yellow pigment | 1.8 parts by weight |
| (Paliotol Yellow D1819, BASF AG) | |
| Dispersant (Solsperse 24000, Zeneca Co., Ltd.) | 3.0 parts by weight |
| Monomer (SR399, Thertomer Co., Ltd.) | 4.0 parts by weight |
| Polymer 1 | 5.0 parts by weight |
| Initiator (Irugacure 907, Ciba-Geigy Co.) | 1.4 parts by weight |
| Initiator | 0.6 part by weight |
| (2,2'-bis(o-chlorophenyl)-4,5,4',5'-tetraphenyl-1,2'-biimidazole) | |
| Solvent | 80.0 parts by weight |
| (propylene glycol monomethyl ether acetate) | |

| (Photosensitive coating B1 for blue pattern) | |
|---|---|
| Blue pigment | 6.0 parts by weight |
| (Heliogen Blue L6700F, BASF AG) | |
| Pigment derivative | 0.6 part by weight |
| (Solsperse 12000, Zeneca Co., Ltd.) | |
| Dispersant (Solsperse 24000, Zeneca Co., Ltd.) | 2.4 parts by weight |
| Monomer (SR399, Thertomer Co., Ltd.) | 4.0 parts by weight |
| Polymer 1 | 5.0 parts by weight |
| Initiator (Irugacure 907, Ciba-Geigy Co.) | 1.4 parts by weight |
| Initiator | 0.6 part by weight |
| (2,2'-bis(o-chlorophenyl)-4,5,4',5'-tetraphenyl-1,2'-biimidazole) | |
| Solvent | 80.0 parts by weight |
| (propylene glycol monomethyl ether acetate) | |

Polymer 1 described above is a polymer having 16.9 mol-% 2-methacryloyloxyethyl isocyanate added to 100 mol-% copolymer consisting of benzyl methacrylate:styrene:acrylic acid:2-hydroxyethyl methacrylate = 15.6:37.0:30.5:16.9 (molar ratio), and its weight average molecular weight is 42500. Polymer 1 used in other coatings below is also the same.

(2) Coating for the Protective Layer

The coating for the protective layer having the following composition was prepared, and the glass substrate provided with the coating thereon was prepared in the same manner as described above.

(Coating for the protective layer)

| | |
|---|---|
| Monomer (SR399, Thertomer Co., Ltd.) | 7.1 parts by weight |
| Polymer 1 | 8.8 parts by weight |
| Epoxy resin | 9.7 parts by weight |
| (Epicoat 180S70, Yuka Shell Epoxy Co., Ltd.) | |
| Initiator (Irugacure 907, Ciba-Geigy Co.) | 1.4 parts by weight |
| Initiator | 1.0 part by weight |
| (2,2'-bis(o-chlorophenyl)-4,5,4',5'-tetraphenyl-1,2'-biimidazole) | |
| Solvent (dimethyl diglycol) | 38.0 parts by weight |
| Solvent (3-methoxybutyl acetate) | 34.0 parts by weight |

(3) Photosensitive Coating for the Pillar-Shaped Convexes

Two photosensitive coatings S1 and S2 for the pillar-shaped convexes with the compositions below were prepared. Then, each of the prepared photosensitive coatings for the pillar-shaped convexes was applied by spin-coating onto the glass substrate, then pre-baked at 100° C. for 3 minutes, exposed as a whole, spray-developed with 0.01% aqueous KOH, and post-baked at 200° C. for 30 minutes to prepare the glass substrate with the coating.

(Photosensitive coating S1 for the pillar-shaped convexes)

| | |
|---|---|
| Monomer (SR399, Thertomer Co., Ltd.) | 8.7 parts by weight |
| Polymer 1 | 10.9 parts by weight |
| Epoxy resin | 12.1 parts by weight |
| (Epicoat 180S70, Yuka Shell Epoxy Co., Ltd.) | |
| Surfactant | 1.0 part by weight |
| (Nonion HS-210, Nippon Yuka Co., Ltd.) | |
| Initiator (Irugacure 369, Ciba-Geigy Co.) | 1.2 parts by weight |
| Initiator | 1.0 part by weight |
| (2,2'-bis(o-chlorophenyl)-4,5,4',5'-tetraphenyl-1,2'-biimidazole) | |
| Solvent | 29.1 parts by weight |
| (propylene glycol monomethyl ether acetate) | |
| Solvent (3-methoxybutyl acetate) | 36.0 parts by weight |

(Photosensitive coating S2 for the pillar-shaped convexes)

| | |
|---|---|
| Monomer (SR399, Thertomer Co., Ltd.) | 8.7 parts by weight |
| Polymer 1 | 10.9 parts by weight |
| Epoxy resin | 12.1 parts by weight |
| (Epicoat 180S70, Yuka Shell Epoxy Co., Ltd.) | |
| Surfactant | 2.0 parts by weight |
| (Nonion HS-210, Nippon Yuka Co., Ltd.) | |
| Initiator (Irugacure 369, Ciba-Geigy Co.) | 1.2 parts by weight |
| Initiator | 1.0 part by weight |
| (2,2'-bis(o-chlorophenyl)-4,5,4',5'-tetraphenyl-1,2'-biimidazole) | |
| Solvent | 28.1 parts by weight |
| (propylene glycol monomethyl ether acetate) | |
| Solvent (3-methoxybutyl acetate) | 36.0 parts by weight |

B. Treatment for Extraction of Impurities and Measurement of Voltage Holding Ratio and Residual DC ($\Delta E$)

Each of the various glass substrates having the coatings prepared in A above was subjected in the following manner to the treatment for extraction of impurities in a liquid crystal (MLC-6846-000, Merck Japan), and thereafter the voltage holding ratio and residual DC ($\Delta E$) of this liquid crystal were measured under the measurement conditions described below and the results are shown in Table 1 below.

Before the treatment for extraction of impurities, the liquid crystal used had a voltage holding ratio of 98% or more and a residual DC ($\Delta E$) of 0.01 V or less as determined under the following conditions for measurement of voltage holding ratio and residual DC ($\Delta E$).

(Method of Treatment for Extraction of Impurities)

The glass substrate provided with the coating having a surface area of 4 cm$^2$ was dipped in the liquid crystal having a volume of 0.2 ml and kept therein at 105° C. for 5 hours.

(Conditions for Measurement of Voltage Holding Ratio)

A measurement cell having a layer structure consisting of substrate/electrode/orientation layer/liquid crystal/orientation layer/electrode/substrate was prepared, and the liquid crystal subjected to the treatment for extraction of impurities was injected into the cell and measured under the following conditions.

| | |
|---|---|
| Distance between the electrodes: | 5 to 15 $\mu$m |
| Pulse amplitude of the applied voltage: | 5 V |
| Pulse frequency of the applied voltage: | 60 Hz |
| Pulse width of the applied voltage: | 16.67 msec |

(Conditions for Measurement of Residual DC ($\Delta E$))

A measurement cell having a layer structure consisting of substrate/electrode/orientation layer/liquid crystal/orientation layer/electrode/substrate was prepared, and the liquid crystal subjected to the treatment for extraction of impurities was injected into the cell and measured under the following conditions for the residual DC ($\Delta E$) (that is, a voltage shift (shown by the arrow in FIG. 2) in the electrostatic capacity defined by formula (CO+Cs)/2 where Cs is the maximum electrostatic capacity and CO is the minimum electrostatic capacity in a voltage-electrostatic capacity hysteresis loop).

| | |
|---|---|
| Distance between the electrodes: | 5 to 15 $\mu$m |
| Liquid crystal used: | A liquid crystal with an electrostatic capacity saturation voltage (Vs' in FIG. 2) of 10 V or less |
| Voltage range measured in the voltage-electrostatic capacity hysteresis loop: | −10 V to +10 V |

TABLE 1

| Coating | Voltage holding ratio (%) | Residual DC (V) |
|---|---|---|
| Photosensitive coating for black matrix | 80 | 0.4 |
| Photosensitive coating R1 for red pattern | 93 | 0.04 |
| Photosensitive coating G1 for green pattern | 95 | 0.01 |

TABLE 1-continued

| Coating | Voltage holding ratio (%) | Residual DC (V) |
|---|---|---|
| Photosensitive coating G2 for green pattern | 65 | 0.81 |
| Photosensitive coating B1 for blue pattern | 94 | 0.5 |
| Coating for protective layer | 95 | 0.01 |
| Photosensitive coating S1 for pillar-shaped convexes | 95 | 0.01 |
| Photosensitive coating S2 for pillar-shaped convexes | 75 | 0.6 |

Preparation of Color Filters (1) Color Filter Sample 1

As the substrate for color filter, a glass substrate of 100 mm×100 mm and 0.7 mm in thickness (7059 glass produced by Corning Co., Ltd.) was used. This substrate was washed in a usual manner, and then a photosensitive coating for the black matrix having the composition described above was applied onto the whole one side of the substrate, exposed via a mask, developed and post-baked to form a black matrix (thickness 1.5 µm).

The 3 photosensitive coatings R1, G1 and B1 for colored layers having the compositions described above were used to form the colored layers. That is, the photosensitive coating R1 for red pattern was applied by spin-coating thereof onto the whole face of the black matrix on the substrate and pre-baked (100° C., 3 minutes). Thereafter, the red photosensitive resin layer was exposed in alignment via a photo-mask for a predetermined coloring pattern, developed with a developing solution (0.05% aqueous KOH), and post-baked (200° C. for 30 minutes) to form a red pattern (thickness 1.5 µm) in a predetermined position on the black matrix pattern.

Similarly, the photosensitive coating G1 for green pattern was used to form a green pattern (thickness 1.5 µm) in a predetermined position on the black matrix pattern. Further, the photosensitive coating B1 for blue pattern was used to form a blue pattern (thickness 1.5 µm) in a predetermined position on the black matrix pattern.

A color filter (sample 1) having the structure shown in FIG. 1 was thereby obtained.

(2) Color Filter Sample 2

A color filter (sample 2) was prepared in the same manner as for sample 1 described above except that the 3 photosensitive coatings R1, G2 and B1 having the compositions described above were used as the photosensitive coatings for colored layers.

(3) Color Filter Sample 3

A coating for the protective layer having the composition described above was applied by spin-coating thereof to cover the black matrix and the colored layers in the color filter (sample 2) described above and dried to form a protective layer of 1.5 µm to give a color filter (sample 3) having the structure shown in FIG. 4.

(4) Color Filter Sample 4

The photosensitive coating S1 for pillar-shaped convexes having the composition described above was applied by spin-coating thereof to cover the protective layer of the color filter (sample 3) described above and pre-baked (100° C., 3 minutes). Thereafter, the sample was exposed via a photo-mask for predetermined pillar-shaped convexes, developed with a developing solution (0.01% aqueous KOH), and post-baked (200° C., 30 minutes) to form a plurality of pillar-shaped protrusions of 5 µm in height, thus preparing a color filter (sample 4) having the structure as shown in FIG. 5.

(5) Color Filter Sample 5

A color filter (sample 5) was prepared in the same manner as for sample 4 described above except that the photosensitive coating S2 having the composition described above was used as the photosensitive coating for pillar-shaped convexes.

Preparation of Liquid Crystal Displays

A transparent common electrode consisting of indium tin oxide (ITO) was formed on the color filters (samples 1 to 5) described above.

As the transparent substrate, a glass substrate of 100 mm×100 mm and 0.7 mm in thickness (7059 glass produced by Corning Co., Ltd.) was used. This substrate was washed in a usual manner, then thin film transistors (TFT) were formed in a plurality of predetermined positions on the substrate, and a transparent picture element electrode connected to a drain electrode of each TFT was formed from indium tin oxide (ITO), whereby an opposite electrode substrate was prepared.

Then, polyimide resin coatings were applied to cover the transparent common electrode of each color filter and the transparent picture element electrode of the opposite electrode substrate respectively, dried, and subjected to orientation treatment by providing them with an orientation layer (thickness 0.07 µm).

Then, these color filters and the opposite electrode substrate were used to prepare liquid crystal displays (samples 1 to 5). As the liquid crystal, MLC-6846-000 (Merck Japan) was used.

Evaluation of the Liquid Crystal Displays

A picture was indicated on the 5 prepared liquid crystal displays (samples 1 to 5) continuously for 72 hours under the conditions of 23° C. and 60% RH, and evaluated for display qualities under the following criteria. The results are shown in Table 2 below.

(Criteria for Evaluation of Display Qualities)

◯: Very good display qualities without sticking or white stain.
X: Poor display qualities with sticking and white stain.

TABLE 2

| Liquid crystal display | Black matrix | Coating for colored layer | | | Protective layer | Coating for pillar-shaped convexes | Display qualities |
|---|---|---|---|---|---|---|---|
| | | Red | Green | Blue | | | |
| Sample 1 | present | R1 | G1 | B1 | absent | — | ○ |
| Sample 2 | present | R1 | G2 | B1 | absent | — | X |
| Sample 3 | present | R1 | G2 | B1 | present | — | ○ |
| Sample 4 | present | R1 | G2 | B1 | present | S1 | ○ |
| Sample 5 | present | R1 | G2 | B1 | present | S2 | X |

As shown in Table 2, the liquid crystal displays in samples 1, 3 and 4 are free of insufficiencies of display for a long time at high temperature under high humidity because the color filters therein are those wherein the rein members brought directly into contact with the liquid crystal layer or positioned nearest to the liquid crystal layer via the orientation layer or the transparent electrode are to make a voltage holding ratio of 80% or more and a residual DC ($\Delta E$) of 0.5 V or less in the liquid crystal subjected to the treatment for extraction of impurities.

On the other hand, both the liquid crystal displays in samples 2 and 5 show display insufficiencies such as sticking and white stain because in sample 2, the green pattern in the colored layer brought directly into contact with the liquid crystal layer is to make a voltage holding ratio of less than 80% and a residual DC ($\Delta E$) of more than 0.5 V, and in sample 5, the pillar-shaped convexes making a voltage holding ratio of less than 80% and a residual DC ($\Delta E$) of more than 0.5 V is directly brought into contact with the liquid crystal layer.

What is claimed is:

1. A color filter comprising a substrate, a resin colored layer consisting of a plurality of colors formed in a predetermined pattern on the substrate, and a common transparent electrode layer, said resin colored layer bringing about a voltage holding ratio of 80% or more and a residual DC ($\Delta E$) of 0.5 V or less in a liquid crystal subjected to treatment for extraction of impurities.

2. A color filter comprising a substrate, a colored layer consisting of a plurality of colors formed in a predetermined pattern on the substrate, a transparent resin protective layer formed to cover at least the colored layer, and a common transparent electrode layer, said resin protective layer bringing about a voltage holding ratio of 80% or more and a residual DC ($\Delta E$) of 0.5 V or less in a liquid crystal subjected to treatment for extraction of impurities.

3. The color filter according to claim 2, comprising transparent resin pillar-shaped convexes formed in a plurality of predetermined regions on the substrate and protruded from the resin protective layer, said resin pillar-shaped convex bringing about a voltage holding ratio of 80% or more and a residual DC ($\Delta E$) of 0.5 V or less in a liquid crystal subjected to treatment for extraction of impurities.

4. A liquid crystal display comprising a color filter and an opposite electrode substrate opposite to each other to provide a gap via a sealing member and a liquid crystal layer sealed in the gap, said color filter being a color filter described in claim 1.

5. A liquid crystal display comprising a color filter and an opposite electrode substrate opposite to each other to provide a gap via a sealing member and a liquid crystal layer sealed in the gap, said color filter being a color filter described in claim 2.

6. A liquid crystal display comprising a color filter and an opposite electrode substrate opposite to each other to provide a gap via a sealing member and a liquid crystal layer sealed in the gap, said color filter being a color filter described in claim 3.

7. A liquid crystal display comprising a color filter and an opposite electrode substrate opposite to each other to provide a gap via a sealing member and a liquid crystal layer sealed in the gap, wherein the color filter is a color filter described in claim 1, the opposite electrode substrate comprises a semiconductor driving element provided with a resin shading layer, and the resin shading layer brings about a voltage holding ratio of 80% or more and a residual DC ($\Delta E$) of 0.5 V or less in a liquid crystal subjected to treatment for extraction of impurities.

8. A liquid crystal display comprising a color filter and an opposite electrode substrate opposite to each other to provide a gap via a sealing member and a liquid crystal layer sealed in the gap, wherein the color filter is a color filter described in claim 2, the opposite electrode substrate comprises a semiconductor driving element provided with a resin shading layer, and the resin shading layer brings about a voltage holding ratio of 80% or more and a residual DC ($\Delta E$) of 0.5 V or less in a liquid crystal subjected to treatment for extraction of impurities.

9. A liquid crystal display comprising a color filter and an opposite electrode substrate opposite to each other to provide a gap via a sealing member and a liquid crystal layer sealed in the gap, wherein the color filter is a color filter described in claim 3, the opposite electrode substrate comprises a semiconductor driving element provided with a resin shading layer, and the resin shading layer brings about a voltage holding ratio of 80% or more and a residual DC ($\Delta E$) of 0.5 V or less in a liquid crystal subjected to treatment for extraction of impurities.

10. A liquid crystal display comprising a color filter and an opposite electrode substrate opposite to each other to provide a gap via a sealing member and a liquid crystal layer sealed in the gap, wherein the color filter is a color filter described in claim 1, the opposite electrode substrate comprises a semiconductor driving element provided with resin pillar-shaped convexes, and the resin pillar-shaped convexes bring about a voltage holding ratio of 80% or more and a residual DC ($\Delta E$) of 0.5 V or less in a liquid crystal subjected to treatment for extraction of impurities.

11. A liquid crystal display comprising a color filter and an opposite electrode substrate opposite to each other to provide a gap via a sealing member and a liquid crystal layer sealed in the gap, wherein the color filter is a color filter described in claim 2, the opposite electrode substrate comprises a semiconductor driving element provided with resin pillar-shaped convexes, and the resin pillar-shaped convexes bring about a voltage holding ratio of 80% or more and a residual DC ($\Delta E$) of 0.5 V or less in a liquid crystal subjected to treatment for extraction of impurities.

12. A liquid crystal display comprising a common electrode substrate and an opposite electrode substrate opposite to each other to provide a gap via a sealing member and a liquid crystal layer sealed in the gap, wherein the common electrode substrate comprises a common transparent electrode layer on the substrate, the opposite electrode substrate comprises semiconductor driving elements and a resin colored layer consisting of a plurality of colors formed in a predetermined pattern corresponding to each of the semiconductor driving elements, and the resin colored layer brings about a voltage holding ratio of 80% or more and a residual DC ($\Delta E$) of 0.5 V or less in a liquid crystal subjected to treatment for extraction of impurities.

13. A liquid crystal display comprising a color filter and an opposite electrode substrate opposite to each other to provide a gap via a sealing member and a liquid crystal layer sealed in the gap, wherein the color filter comprises a substrate and a reflective layer, a resin colored layer consisting of a plurality of colors and a common transparent electrode layer laminated in this order over the substrate, and the resin colored layer brings about a voltage holding ratio of 80% or more and a residual DC ($\Delta E$) of 0.5 V or less in a liquid crystal subjected to treatment for extraction of impurities.

14. A liquid crystal display comprising a common electrode substrate and an opposite electrode substrate opposite to each other to provide a gap via a sealing member and a liquid crystal layer sealed in the gap, wherein the common electrode substrate comprises a common transparent electrode layer on the substrate, the opposite electrode substrate comprises a substrate and a driving element layer, a reflective electrode layer, and a resin colored layer consisting of a plurality of colors laminated in this order over the substrate, and the resin colored layer brings about a voltage holding ratio of 80% or more and a residual DC ($\Delta E$) of 0.5 V or less in a liquid crystal subjected to treatment for extraction of impurities.

\* \* \* \* \*